(No Model.)

A. F. FLETCHER.
TONGS OR PLIERS.

No. 432,933. Patented July 22, 1890.

Witnesses.
Oscar A. Scott
Charles A. Newton

Inventor.
Allen F. Fletcher

UNITED STATES PATENT OFFICE.

ALLEN F. FLETCHER, OF ATHOL, MASSACHUSETTS.

TONGS OR PLIERS.

SPECIFICATION forming part of Letters Patent No. 432,933, dated July 22, 1890.

Application filed June 15, 1888. Serial No. 277,278. (No model.)

*To all whom it may concern:*

Be known that I, ALLEN F. FLETCHER, a citizen of the United States, residing at Athol, in the county of Worcester and Commonwealth of Massachusetts, have invented a new and useful Pair of Tongs, of which the following is a specification.

Figure 1:
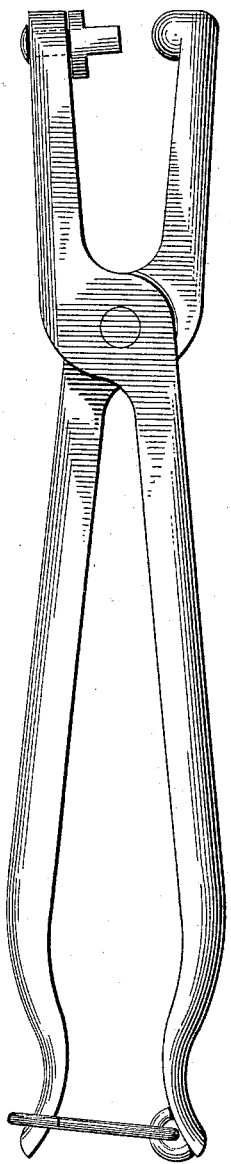
Figure 2:

My invention relates to improvements in tongs: first, a pair of tongs provided with a swivel-jaw at or near the end of one of the jaws, and the opposite jaw is provided with a cone or oval point, as shown in the drawings, Figure 1. Fig. 2 shows an end view with swivel-jaw and the oval point on the opposite jaw. When tools or material are placed between the swivel-jaw and the oval point, they can be held firmly at any angle desired.

What I do claim as my invention, and desire to secure by Letters Patent, is—

A pair of tongs provided with a swivel-jaw at or near the end of one of the jaws, and an oval point on the opposite jaw, as described in specification and drawings.

In testimony whereof I affix my signature, in presence of two witnesses, this 21st day of January, A. D. 1890, this application being in fact and intention an amendment to application, Serial No. 277,278, filed June 15, A. D. 1888.

ALLEN F. FLETCHER.

Witnesses:
FRANK W. GOURLAY,
OSCAR A. SCOTT.